(12) United States Patent
Kondo et al.

(10) Patent No.: US 6,582,628 B2
(45) Date of Patent: Jun. 24, 2003

(54) CONDUCTIVE MELT-PROCESSIBLE FLUOROPOLYMER

(75) Inventors: Shosaku Kondo, Shimizu (JP); Kasuke Ishii, Shimizu (JP); Hajime Sato, Shimizu (JP); Jeong Chang Lee, Shimizu (JP); Noriyuki Suzuki, Shimizu (JP)

(73) Assignee: DuPont Mitsui Fluorochemicals, Tokyo (JP)

( * ) Notice: Subject to any disclaimer, the term of this patent is extended or adjusted under 35 U.S.C. 154(b) by 0 days.

(21) Appl. No.: 10/151,831

(22) Filed: May 21, 2002

(65) Prior Publication Data

US 2003/0004257 A1 Jan. 2, 2003

Related U.S. Application Data

(63) Continuation-in-part of application No. 10/047,196, filed on Jan. 15, 2002, now abandoned.

(30) Foreign Application Priority Data

| Jan. 17, 2001 | (JP) | 2001-008045 |
| Jul. 2, 2001 | (JP) | 2001-200488 |
| Oct. 29, 2001 | (JP) | 2001-330324 |

(51) Int. Cl.[7] .............. H01B 1/04; H01B 1/20; C08K 3/04; C08J 3/20
(52) U.S. Cl. ......... 252/511; 252/500; 252/502; 252/511; 524/495; 524/496; 264/103; 264/104; 264/331.4; 264/127
(58) Field of Search ............... 252/500, 502, 252/511; 524/495, 496; 264/103, 104, 331.14, 127

(56) References Cited

U.S. PATENT DOCUMENTS

| 3,701,749 A | 10/1972 | Segawa et al. |
| 3,719,644 A | 3/1973 | Segawa et al. |
| 4,980,541 A | * 12/1990 | Shafe et al. ............. 219/548 |
| 5,000,875 A | 3/1991 | Kolouch |
| 5,093,409 A | * 3/1992 | Buckmaster ............ 524/544 |
| 5,106,539 A | 4/1992 | Nakamura et al. |
| 5,464,904 A | * 11/1995 | Chapman, Jr. et al. ..... 525/200 |

FOREIGN PATENT DOCUMENTS

| JP | 11-35694 | 2/1999 |
| JP | 2000-103865 | 4/2000 |

OTHER PUBLICATIONS

Ebnesajjad, "Fluoroplastics", Plastics Design Library, vol.–1, 2000, pp. 47–60, 220–246.*
Judovits et al, "Plastics: Bridging the Millenia, vol.–2;, Materials", Antec, 1999, Section–T–12.*
Humphrey et al, "Encyclopedia of Polymer Swcience and Technology", John Wiley and Sons, Inc., 2002, Vinylidene Fluoride Polymer.*
J. of Applied Polymer Sci. vol. 69, P. 193–199 (1998).

* cited by examiner

Primary Examiner—Mark Kopec
Assistant Examiner—Kallambella M Vijayakumar (57) ABSTRACT

A method for producing an electrically conducting melt-processible fluoropolymer comprising pulverizing a composition of (a) carbon aggregate and (b) coagulum particles of aqueous dispersion polymerized melt-processible fluoropolymer, coating the coagulum particle with the disintegrated particles of carbon black. The preferred composition comprises a structured carbon black such as acetylene black and a melt processable fluoropolymer wherein said melt processable fluoropolymer has two crystallization peaks in a DSC cooling curve when allowed to crystallize from a temperature of not less than its melting point at a cooling rate of 12° C./min; and the ratio of the crystallization peak heights (high temperature side peak/low temperature side peak) is 0.65 or greater; and/or the ratio of the high temperature side crystallization peak area to the total area of the crystallization peaks [high temperature side peak area/(high temperature side peak area+low temperature side peak area)] is 0.18 or greater.

20 Claims, 1 Drawing Sheet

FIG. 1

CONDUCTIVE MELT-PROCESSIBLE FLUOROPOLYMER

This application is a continuation-in-part of U.S. patent application Ser. No. 10/047,196 filed Jan. 15, 2002, now abandoned.

FIELD OF THE INVENTION

This invention relates to melt-processible fluoropolymer rendered conductive by the incorporation of carbon black.

BACKGROUND OF THE INVENTION

Fluoropolymers are used in containers and hoses for flammable fluids because they are little affected by such fluids and also are highly impermeable to them. Because the containers and hoses should have some electrical conductivity to prevent the accumulation of static charge, which can cause safety problems, fillers are added to the fluoropolymers to confer electrical conductivity. To obtain articles having uniform electrical conductivity, it is desirable that fillers that impart conductivity be uniformly distributed.

Japanese Kokai Patent Hei 11 (1999)-35694 discloses a method for granulation of melt-processible fluoropolymer by the addition of polyfluoroalkyl alkyl ether to aqueous fluorocarbon dispersion. The resultant fluoropolymer powder granules have a large average particle size (1.0 to 1.5 mm according to the Examples). Addition of conductive filler to these granules leads to uneven distribution of the filler and this adversely affects conductivity of articles melt-fabricated from the granule/filler mixture.

Japanese Kokai Patent 2000-103865 discloses a method to obtain an improved fluoropolymer powder. After melt-processible fluoropolymer obtained from the solution polymerization or suspension polymerization is coagulated and granulated, the granules are ground and heat-treated above the melting point of the polymer to melt at least some of particles thereby obtaining a fluoropolymer powder. The average particle size of the resultant fluoropolymer powder is as large as 0.5 to 5.0 mm, i.e. the grinding of these granules generally does not reduce the average particle size of the granules to less than 0.5 mm (500 $\mu$m). The grinding of fluoropolymer granules has the further disadvantage of being an expensive operation. Mixing of conductive filler with these ground granules yields compositions, which when melt-fabricated, give articles in which the conductive filler is not uniformly distributed.

Another method for obtaining a fluoropolymer/carbon black composition involves mixing tetrafluoroethylene/perfluoro(alkyl vinyl ether) (PFA) with acetylene black as a conducting carbon black in a Henshel mixer (U.S. Pat. No. 5,106,539). Still another method involves melt-mixing a terminal-group-fluorinated PFA with a conducting carbon black for reduced electrical resistance and a minimized increase in relative viscosity (U.S. Pat. No. 5,005,875).

However, these fluoropolymer/carbon black compositions have not shown satisfactory properties for use in electronic and electrical devices and parts applications that require smooth and high-precision surfaces, uniform electrical conductivity and little or no contamination, i.e. little or no release of the carbon black into the use environment, e.g. process liquids used in the manufacture of semi-conductors.

The electrical resistance of conducting fluoropolymer compositions is known to vary not only with the type and amount of the conducting carbon black mixed therewith, but also greatly with the way the conducting carbon black is dispersed (Journal of Applied Polymer Science Vol. 69, p.193 (1998)). However, with the mixing methods described in the patent specifications cited above, which call for mixing PFA particles with conducting carbon black in a Henshel mixer and then mixing in a melt extruder, or for forcing the PFA pellets to be melt mixed with conducting carbon black by the shearing force of the extruder, it has been difficult to disperse the mixed fine conducting carbon black powder uniformly in the PFA resin. In particular, melt-mixing the conducting carbon black with the melt processible fluoropolymer in an extruder causes simultaneous dispersion of the conducting carbon black and destruction of the structure of the carbon black during the melt mixing state, making it extremely difficult for the composition to provide controlled stable conductivity. Because the conducting carbon black is dispersed non-uniformly, there is considerable variation in the conductivities and the physical properties within the same manufactured batch, or between batches, with the formation of agglomerates of non-uniformly dispersed carbon black and/or undispersed fluoropolymer. This has made it difficult to obtain a molded article with a smooth surface and also has made it impossible to obtain a shaped article product, which when used in a wafer holding jig or solvent line employed in semi-conductor manufacturing devices, would not release the conducting carbon black particles into the liquid of the device.

There is a need for a process for improved mixing of fluoropolymer and carbon black to give a composition that can be melt-fabricated into articles having uniform conductivity.

SUMMARY OF THE INVENTION

The present invention satisfies this need by providing a method for producing a uniform mixture of carbon black in melt-processible fluoropolymer, comprising pulverizing a composition comprising (a) said carbon black and (b) said melt-processible fluoropolymer, said carbon black in said composition being in the form of aggregates of primary particles and said melt-processible fluoropolymer in said composition being in the form of coagulum particles of aqueous dispersion polymerized melt-processible fluoropolymer, the pulverizing of said composition causing the disintegration of said aggregates and the coating of said coagulum particles with the disintegrated particles, thereby obtaining said uniform mixture.

In another embodiment, the present invention relates to a method for producing a melt-processible fluoropolymer powder having an average particle size of no more than 10 $\mu$m, comprising stirring an aqueous dispersion polymerization medium containing said fluoropolymer polymerized in said medium, said medium also containing electrolyte, to form a coagulum of said fluoropolymer, separating said coagulum from the resulting medium, drying said coagulum, and then pulverizing said dried coagulum together with carbon black having a primary particle size of no more than about 0.1 $\mu$m, and obtaining said powder as a uniform mixture of said carbon black in said fluoropolymer.

The resultant powder can be melt-fabricated into articles that have uniform electrical conductivity.

Use of a particular type of electrically conducting carbon black, i.e. one which has a developed structure (fine powder aggregates of very small primary particles as described hereinafter) provides a melt fabricable electrically conducting fluoropolymer composition which exhibits a unique DSC fingerprint. Thus such composition comprises conducting carbon black dispersion in a melt processible fluoropolymer wherein said melt processible fluoropolymer has two crystallization peaks as determined by differential scanning calorimeter (DSC) when said composition is allowed to crystallize from a temperature of not less than its melting point at a cooling rate of 12° C./min; said two crystallization peaks consisting of a high temperature side peak and a low temperature side peak, and wherein the ratio of the crystallization peak heights (high temperature side peak/low temperature side peak) is 0.65 or greater; and/or the ratio of the high temperature side crystallization peak area to the total area of the crystallization peaks [high temperature side peak area/(high temperature side peak area+low temperature side peak area)] is 0.18 or greater.

Whereas the process of the present invention in general provides electrically conductive fluoropolymer compositions, which when melt fabricated, provide articles of high surface smoothness and low surface resistivity, characteristic of dispersion uniformity, the compositions of the present invention provide further improvement in dispersion uniformity, characterized by the additional improvements of both high surface smoothness and low surface resistivity, together with more intimate association of the carbon black with the fluoropolymer as indicated by articles melt fabricated from the composition not releasing carbon black particles into process liquids which come into contact with the molded article in use. Most electrically conducting carbon blacks do not provide the DSC fingerprint described above and the improvements just noted. Acetylene black has been found to provide both. It is contemplated that other electrically conducting carbon blacks exist that will act like acetylene black, particularly those that have structure like acetylene black, i.e. fine powder of very small primary carbon black particles. These aggregates disintegrate during the pulverizing process to much smaller aggregates, enabled by the fineness of the primary particles, to further improve the uniformity of the dispersion of the carbon black into and onto the fluoropolymer fine powder present in the pulverizing process.

DETAILED DESCRIPTION

Process

In the process of the present invention, the melt-processible fluoropolymer starting material is made by aqueous dispersion polymerization, and typically contains from about 1 to about 75% fluoropolymer of submicron, i.e. less than about 1 $\mu$m, particle size. Preferred concentrations of the fluoropolymer in the aqueous medium are 5–60 wt %, more preferably 10–55 wt %, still more preferably 20–50 wt % and most preferably 25–45 wt %, all wt % being based on the total weight of the fluoropolymer plus the polymerization medium. Preferably the polymer particles in the aqueous dispersion have an average size of less than about 0.5 $\mu$m, more preferably less than about 0.3 $\mu$m, most preferably from about 0.05 to about 0.2 $\mu$m, these being the primary particle sizes of the fluoropolymer.

The melt processible fluoropolymers used in the present invention are polymers or copolymers of monomers selected from tetrafluoroethylene, chlorotrifluoroethylene, perfluoroolefins such as hexafluoropropylene, perfluoro(alkyl vinyl ether), vinylidene fluoride, and vinyl fluoride, or copolymers with such other monomers as ethylene. By copolymer is meant polymers made by polymerizing two or more monomers. These polymers or copolymers typically contain at least about 35 weight % fluorine. Examples of the melt-processible fluoropolymer include copolymers of tetrafluoroethylene (TFE) with one or more perfluoro(alkyl vinyl ethers) (PAVE) such as perfluoro(methyl vinyl ether), perfluoro(ethyl vinyl ether), and perfluoro(propyl vinyl ether). These polymers are also known as PFA. The alkyl group of the perfluoro(alkyl vinyl ethers) may be linear, branched, or cyclic, and may contain 1–10 carbon atoms and may include one or more ether oxygens. Preferably the alkyl group contains 1–5 carbon atoms, more preferably 1–3 carbon atoms. The perfluoro(alkyl vinyl ether) content of the copolymer is typically about 1–10 wt %, preferably about 3–8 wt %, based on the total weight of the copolymer. Other examples of fluoropolymers are: copolymers of two or more perfluoroolefins such as a copolymer of TFE with hexafluoropropylene (FEP); a copolymer of TFE with hexafluoropropylene and PAVE; copolymers of perfluoroolefins with olefins such as TFE-ethylene copolymer (ETFE); a copolymer of chlorotrifluoroethylene with ethylene (ECTFE), polychlorotrifluoroethylene (PCTFE), and polyvinylidene fluoride (PVDF). Copolymers of TFE are preferred. In the TFE copolymers with perfluoro(alkyl vinyl ethers), perfluoro(ethyl vinyl ether) or perfluoro(propyl vinyl ether) are the preferred comonomers. The perfluoro(alkyl vinyl ether) content is typically about 1–10 wt %, preferably about 3–8 wt %.

The term "melt-processible" means that the copolymer can be processed (i.e., fabricated into shaped articles such as films, fibers, tubes, wire coatings and the like) by conventional melt-extruding means. Melt-processibility requires that the melt viscosity at the processing temperature be no more than about $10^6$ Pa·s. Preferably it is in the range of about $10^2$ to $10^6$ Pa·s, and most preferably about $10^3$ to $10^5$ Pa·s. The addition of carbon black results in a viscosity increase and this should be taken into consideration in formulating the electrically conducting fluoropolymer compositions to obtain the overall melt viscosity desired for melt fabrication.

The aqueous dispersion of melt-fabricable fluoropolymer is coagulated to form a coagulum of the fluoropolymer, typically by the addition of electrolyte to the aqueous medium and agitating the dispersion. Examples of electrolytes that can be used for coagulating the fluoropolymer dispersion are inorganic or organic compounds such as aqueous HCl, $H_2SO_4$, $HNO_3$, $H_3PO_4$, $Na_2SO_4$, $MgCl_2$, $CaCl_2$, sodium formate, potassium acetate, ammonium carbonate. Among them, compounds that volatilize in the later drying process of the melt-processible fluoropolymer coagulum particles, such as HCl, and $HNO_3$, are preferred.

These electrolytes are preferably used in the proportion of about 1 to about 15 wt % with respect to the weight of a melt-processible fluoropolymer in the aqueous dispersion, more preferably about 1.5 to about 10 wt %. To facilitate mixing, it is preferred that the electrolyte be added to the fluoropolymer dispersion as an aqueous solution. If the amount of the electrolyte used is too small, coagulation is slow and productivity suffers. If the amount used is too large, extra washing of the coagulated polymer is required.

Coagulation may be done in any vessel that is capable of agitation, the agitator preferably having a circumferential velocity (also called tip speed) of about 4 m/s or greater. Examples of effective shapes of the agitator blades include propeller, turbine, paddle, shell-type, horse-shoe, anchor, and spiral. The vessel should have drainage. Proper coagulation, to get the polymer to separate from the solution by floating to the top, requires adequate agitation, which is generally provided by the agitator operating at a tip speed of about 4 m/s or greater, until separation is complete. With insufficient agitation coagulation is slow and separation of water from the polymer is difficult. The agitation is carried out until the aggregated particles (coagulated polymer) are separated from the aqueous medium.

After draining aqueous medium from the coagulated polymer and washing with water as necessary, the fluoropolymer is dried at a temperature below its melting point. The dry coagulum particles thus obtained (fine powder) can be considered "pristine dried coagulum particles". By pristine is meant that the particles are in their original or as-formed state and that they have not been subjected to size reduction or comminution and have not been granulated (agglomerated or pelletized) to larger particles.

The average particle size of the coagulum particles thus obtained is about 10 $\mu$m or less, but will typically be at least about 1 $\mu$m, and preferably in the range of about 2 to 6 $\mu$m. The particles are made up of coagulated primary particles of the fluoropolymer. The use of coagulum particles, which by virtue of the coagulation process have an average particle size of no more than 10 $\mu$m, is an important feature of the present invention.

The melt-processible fluoropolymer powder thus obtained is combined with carbon black and the combination is mixed as will be further described below. Conductive carbon blacks such as Ketjen black, acetylene black, oil furnace black, thermal black and channel black are preferred, while Ketjen black and acetylene black having average primary particle size of about 0.1 $\mu$m or less is more preferred. If the particle size of the carbon black used is larger than about 0.1 $\mu$m, segregation of carbon black occurs easily during melt processing and uniform surface resistivity is difficult to obtain. For making extruded articles with good surface smoothness, using acetylene black with low impurity content is preferred. Where low surface resistivity is more important, Ketjen black is preferred. Allowance must be made for the higher impurity content of Ketjen black compared to acetylene black and the resulting reduced surface smoothness.

Though the preferred carbon blacks preferably have a primary particle size of less than about 0.1 $\mu$m, the carbon blacks exist as aggregates of primary particles of greater than about 1 $\mu$m in average size and usually greater than about 2 $\mu$m, and these aggregates aggregate further to form larger aggregates.

The amount of carbon black compounded depends on the desired conductivity. Carbon black is compounded in such amount that the composition of article obtained from the melt processible fluoropolymer powder produced with the mixing process should have a surface resistivity of about $10^{16}$ $\Omega$ or lower, preferably about $10^{14}$ $\Omega$ or lower. Preferably, the conductive carbon black content in the compositions being subject to the mixing process and thus in the resultant uniform mixture, should be about 1–15 wt %, more preferably about 1–10 wt %, even more preferably about 4 to 10 wt %, and most preferably about 5 to 10 wt %, based upon composition weight, i.e. weight of fluoropolymer plus weight of carbon black.

In addition to carbon black, other additives may be included in the composition. Examples are powder or fibrous glass, graphite, alumina, mica, silicon carbide, boron nitride, titanium oxide, bismuth oxide, iron oxide, bronze, gold, silver, copper, nickel, stainless steel or molybdenum disulfide.

In the process of the present invention, the apparatus for mixing the conductive carbon black and the melt-processible fluoropolymer coagulum particles of average diameter of 10 $\mu$m or smaller is a cutter-mixer having sharp blades that can be rotated at high speed. This is another important feature of the present invention, i.e. the mixing involves pulverizing the composition, which results in the formation of a uniform mixture of the carbon black and fluoropolymer components. An example of a commercially available cutter mixer is the "Cutter Mixer", manufactured by Aikosha Seisakusho. This high-speed rotation impact shear mixer is different in its mixing influence on the dispersion state of the conducting carbon black from the conventional Henshel mixer, which uses simple blades and rotates and mixes at no more than 1500 rpm, in that it has sharp knives which rotate at a high speed, i.e. a cutter knife tip circumferential speed of at least 17 m/sec, with at least 35 m/sec being preferred for use in the present invention, thereby pulverizing and mixing the conducting carbon black fine powder with the melt processible fluoropolymer fine powder. In the high speed cutter-mixers blade rotation of about 2000 rpm or greater, or peripheral speed, i.e. tip speed, which is the speed of the outermost point of the rotating element, of about 35 m/sec or higher, preferably 50 m/sec or higher, is preferred. More preferred is rotation of about 3000–20000 rpm or peripheral speed of about 70–115 m/sec. The average size of the particles of the resultant uniform mixture according to this invention is not less than about 10% of the average size of the melt-processible fluoropolymer fine powder (coagulum particles), preferably not less than about 20% of the average size of the melt-processible fluoropolymer powder, more preferably not less than about 50% of the average size of the melt-processible fluoropolymer powder, and most preferably not less than about 70% of the average size of the melt-processible fluoropolymer powder in the mixture prior to this pulverizing.

The cutter-mixer (pulverizing process) has more of a particle size reduction effect on the carbon black aggregates than on the fluoropolymer coagulum particles, i.e. the cutter mixer disintegrates the carbon black aggregates, reducing them to smaller aggregates of carbon black primary particles preferably having an average particle size of no greater than about 1 $\mu$m. The cutter mixer causes the disintegrated carbon black particles (smaller aggregates) to coat the fluoropolymer coagulum particles. This coating is in the form of carbon black particles clustered around each coagulum particle giving the appearance of a gray powder, even under magnification. It is believed that the carbon black particles are at least in part fused and/or embedded in the fluoropolymer coagulum particles, i.e. more than simply physically mixed with the coagulum particles. Compositions of fluoropolymer and carbon black made according to the process of this invention do not separate significantly into the fluoropolymer and carbon components when shaken. The resultant uniform mixture of fluoropolymer and carbon black exiting the cutter-mixer is hot, but not so hot as to cause melting of the fluoropolymer, e.g. the temperature of the uniform mixture is in the range of about 125 to 225° C., caused by the pulverizing action of the cutter-mixer. The heating up of the composition during the pulverizing process apparently causes the coating of the coagulum particles with the carbon black particles. The coating of the small coagulum particles with the even smaller carbon black particles resulting from the pulverizing process provides articles which, when melt fabricated from this composition exhibit uniform electrical conductivity. Thus the uniformity of the carbon black/fluoropolymer mixture is indicated by the uniform electrical conductivity, conveniently measured as electrical resistivity, of articles melt-fabricated from the mixture.

If it is desired to use the composition of this invention as a concentrate that can be made and then later melt-blended with other fluoropolymer and molded in to articles having uniform resistivity and smooth surfaces, a greater amount of carbon black than about 1–15 wt % based on the composition weight can be mixed with the dried coagulated fluoropolymer particles. The melt-processible fluoropolymer powder composition obtained with the above-mentioned pulverizing/mixing is preferably recovered with a cyclone or bag filter as it is cooled to room temperature. By doing this, a melt-processible fluoropolymer powder having about 10 $\mu$m or less in average particle size, preferably about 1 to 10 $\mu$m and more preferably about 2 to 6 $\mu$m, suitable for producing extruded articles with uniform electrical conductivity is obtained. Because of the small particle size of the disintegrated carbon black aggregates relative to the particle size of the fluoropolymer coagulum particles, the particle size of the pulverized mixture will be about the same as that of the coagulum particles. Thus the coagulum particle size reduction described above applies to the pulverized composition (uniform mixture) as well, i.e. the pulverized composition particle size can be the same as or less than the starting coagulum particle size in accordance with the percentages described above with respect to the coagulum particles.

Such fluoropolymer powder compositions (uniform mixture) may be pelletized by usual melt extruders then melt-processed by extrusion, injection molding, transfer molding, melt spinning, etc. It is also possible to use the conductive fluoropolymer powder compositions obtained from the pulverizing process directly without pelletization as melt-processing raw materials or after compacting for easy feeding through the extruder hopper without bridging, followed by melt fabrication. The fluoropolymer powders of the present invention may be granulated and used for powder molding or powder coating or rotolining or rotomolding.

The composition is suitable for various types of articles such as hoses, tubes and containers for transporting flammable fluids where prevention of accumulation of static electricity is desirable, or for the fixing roll surface of copy machines where control of conductivity is necessary. Besides these applications where electrical conductivity is important, the powder composition is suitable also for tubes, vessels, etc. that need good thermal conductivity.

Product

It has been discovered that it is possible to disperse conducting carbon black very uniformly in the fluoropolymer by pulverizing and mixing electrically conducting carbon black having a developed structure, with fluoropolymer fine powder using an impact shear type mixer with high speed rotating blades in the form of cutters, for example, a Cutter Mixer, as described above. The resultant composition exhibits a unique specific crystallization pattern, i.e. a fingerprint, and has excellent characteristics in that it provides a stable electrical resistance (conductivity), provides molded articles that have smooth and precision surfaces, and which, when used in a wafer holding jig or solvent line employed in the manufacture of semi-conductor devices, does not release conducting particles into the liquid of the device.

In general, it is difficult to determine whether conducting carbon black is uniformly dispersed in a conducting fluoropolymer. Although with a scanning electron microscope (SEM) or transmission electron microscope (TEM) it is possible to observe directly the carbon black dispersed in a conducting fluoropolymer composition, the high magnification permits one to view only a very localized area. This method cannot easily reveal the overall dispersion state for the carbon black.

The present inventors discovered that in making a conducting fluoropolymer composition by cutter mixer blending the carbon black with a fluoropolymer fine powder, the uniformly dispersed carbon black fine powder acts as a nucleation agent during crystallization of the fluoropolymer so that the comparison of the ratio of the crystallization of the fluoropolymer due to nucleation by the carbon black and that due to the normal crystal growth makes it possible to easily evaluate the dispersion of the conducting carbon black in the conducting fluoropolymer. The improved uniformity of the dispersion provides fluoropolymer/carbon black compositions which can be melt-fabricated into articles that have a stable electrical resistance, a smooth and precision surface condition, and will not release, when used in a wafer holding jig or solvent line employed in semi-conductor devices, conducting particles into the liquid of the device, thereby not contaminating the device (semi-conductor).

Thus, this aspect of the present invention relates to an electrically conducting fluoropolymer composition that has a unique crystallization pattern fingerprint, said composition comprising conducting carbon black and a melt processible fluoropolymer powder wherein said electrically conducting fluoropolymer composition has two crystallization peaks when analyzed in a differential scanning calorimeter (DSC) when allowed to crystallize from a temperature of not less than its melting point at a cooling rate of 12° C./min; and the ratio of the crystallization peak heights (high temperature side peak/low temperature side peak) is about 0.65 or greater; and/or the ratio of the high temperature side crystallization peak area to the total area of the crystallization peaks [high temperature side peak area/(high temperature side peak area+low temperature side peak area)] is about 0.18 or greater.

The fluoropolymer composition of the present invention is made by the process comprising pulverizing and mixing a melt processible fluoropolymer powder having an average particle size of not more than 10 $\mu$m with the electrically conducting carbon black using a cutter mixer with a cutter blade circumferential speed of 35 m/sec or greater as described above with respect to the process of the present invention. Also as described above, the melt processible fluoropolymer powder starting material is obtained by adding an electrolyte to an aqueous dispersion of melt processible fluoropolymer colloidal particles, coagulating the fluoropolymer colloidal particles, separating them from the aqueous medium by mechanical agitation, and drying. This aqueous dispersion is obtained by aqueous dispersion polymerization of the monomers providing the resultant fluoropolymer colloidal particles.

The fluoropolymer component in the composition of the present invention can be any of the fluoropolymers described above with respect to the process of the present invention.

The conducting carbon black used in the composition of this invention is preferably acetylene black, which is in the form of a fine powder with well-developed structure. Other blacks, such as oil furnace black, thermal black, channel black, Ketjen black, and the like, do not give the same beneficial results and do not give the ratio of crystallization peak heights and/or peak areas described above. Thus, while the process of the present invention provides fluoropolymer/ electrically conducting carbon black compositions of improved uniformity over prior mixing processes, it is only carbon blacks with well developed structures that provide the best uniformity, which is characterized by the above described crystallization pattern fingerprint and exhibits properties enabling articles melt fabricated therefrom in the most critical applications.

The well developed structure of the carbon black used in the present invention is a chain structure of primary particles linked together to form aggregates (fine powder) having an average particle size greater than 1 µm and usually greater than 2 µm. The primary particles are smaller than that of other conducting carbon blacks and have of an average particle size of less than about 0.05 µm, typically about 0.04 µm. Acetylene black is the most notable carbon black having this structure. The pulverization and mixing together of the carbon black with a melt processable fluoropolymer fine powder with an average particle size of preferably 10 µm or less in a cutter mixer results in a fine and uniform dispersion with a more uniform distribution of the acetylene black particles in the melt processable fluoropolymer fine powder. Therefore, the resultant shaped articles made by melt-processing this fine and uniform dispersion either directly or after pelletization will have a surface state with better smoothness and better precision compared to those obtained by mixing with other conducting carbon blacks. The resulting conducting fluoropolymer composition when used in a wafer holding jig or solvent line employed in semi-conductor devices, will not release carbon black particles into the liquid of the device, thereby not contaminating the device.

The amount of conducting carbon black compounded, which will differ depending upon the goal conducting level, is about 1–15% by weight, with preferred amounts being the same as described above.

In the conducting fluoropolymer composition of this invention, the composition has two crystallization peaks when allowed to crystallize from the melt in a DSC instrument from a temperature at or above the melting point of said melt processable fluoropolymer, at a cooling rate of 12° C./min, wherein the crystallization peak height ratio (high temperature side peak/low temperature side peak) is in a range of about 0.65 or greater, preferably about 0.70–0.90 and/or the ratio of the high temperature side crystallization peak area to the total area of the crystallization peaks [high temperature side peak area/(high temperature peak area+low temperature peak area)] is at least about 0.18, preferably about 0.20–0.27. The composition of this invention showing such a crystallization pattern is a conducting fluoropolymer composition which has a good dispersion state for the conducting carbon black, provides a stable electrical resistance, provides a molded article therefrom with a smooth and precision surface condition, and will not release the conducting particles into the liquid of the device, when used in a wafer holding jig or solvent line employed in semi-conductor devices.

The high temperature side crystallization peak in the present crystallization peak is due to nucleation of the fluoropolymer by the smaller aggregates of primary particles (disintegrated aggregates) of the conducting carbon black powder, while the low temperature side crystallization peak is a normal crystal growth peak. When conducting carbon black is uniformly dispersed, these two peaks are obtained.

The melt processable fluoropolymer composition obtained by pulverization and mixing with conducting carbon black, preferably acetylene black using the above cutter mixer and loading, has features, in addition to the uniform dispersion of the acetylene black in the melt processable fluoropolymer fine powder, in that the finely dispersed acetylene black in the melt processable fluoropolymer fine powder acts as a nucleating agent during crystallization of the fluoropolymer.

In order for a crystalline polymer to crystallize from its melt, it is known that nuclei are first formed and from those nuclei crystals (or spherulites) grow. Materials are known that make finer, i.e. smaller, crystals in fluoropolymers. For example, metal sulfate salts have been used with polychlorotrifluororethylene (Kokai S49-5153); alkali metal salts (e.g. NaCl, KCl) with polyvinylidene fluoride (U.S. Pat. No. 3,719,644), as well as organic cyclic compounds (U.S. Pat. No. 3,701,749). However, acetylene black, which is particularly suitable for use in this invention, has a nucleating effect greater than the materials taught in these patents, so that the heat of crystallization from nucleus formation is high enough to separate the nucleated crystals from those crystals formed without the influence of carbon black-nucleation. This separation is seen in the separate crystallization peaks using a differential scanning calorimeter (DSC).

The conducting carbon black particles, preferably acetylene black, dispersed in the melt processable fluoropolymer act as a nucleating agent for the melt processable fluoropolymer, for example, PFA, so that the more uniformly the carbon black is dispersed, the greater the nucleation, which leads to a correlation between the dispersion state of the acetylene black and the heat of crystallization derived from the nucleated crystals. The greater the heat of crystallization due to carbon black nucleation, the better the dispersion state of the carbon black, thereby resulting in a conducting fluoropolymer powder composition from which shaped articles can be fabricated that have smoother and better precision surfaces than those obtained with other conducting carbon blacks. These articles, when used in a wafer holding jig or solvent line employed in semi-conductor devices, will not release the conducting particles into the liquid of the device, thereby not contaminating the device. Shaped articles obtained from the conducting fluoropolymer composition with better dispersed carbon black will have minimal variation in electrical resistance in the molded articles or between molded articles. The dispersion state of acetylene black and stability in electrical resistance can be evaluated by measuring the ratio of the heat of crystallization due to nucleation with respect to the total heat of crystallization obtained with a DSC (the area ratio A/(A+B) in FIG. 1) or the ratio of the two crystallization peaks (Ratio of the two crystallization peak heights in FIG. 1, H1/H2).

The powder composition exhibits the two crystallization peaks described above, having the indicated ratios of peak heights and/or areas. Articles made from this powder composition also exhibit these peaks whether or not melt fabrication is involved.

In the measurement by DSC of the heat of crystallization due to nucleation by acetylene black, the rate of crystallization (cooling rate) from the melt is important. If the crystallization rate is too fast, the peak from heat of crystallization due to nucleation by the carbon black (high temperature side peak (FIG. 1-A) and that due to normal crystal growth (a low temperature side peak, which normally appears near the usual fluoropolymer crystallization peak), FIG. 1-B) will partially overlap, i.e. they will not be adequately separated. If the cooling rate is too slow, there will be a flatness between the two peaks, which makes it difficult to distinguish the boundary between the peaks. Therefore, in order to evaluate the dispersion state of the conducting carbon black in the melt processable fluoropolymer powder composition, the crystallization rate should be 12° C./min. At this cooling rate, the two peaks can be distinguished.

In the initial stage of crystallization of the melt processible fluoropolymer, the carbon black plays a role of the nucleation agent, resulting in crystallization at a temperature higher than that for the pure melt processable fluoropolymer (FIG. 1-A); but once nucleation is complete, the carbon black becomes a hindrance to the normal crystal growth of the melt processable fluoropolymers, so that the crystallization rate of the conducting fluoropolymer composition will be slower than for a pure melt processable fluoropolymer (the crystal growth will occur over a broader range so that the curve for crystallization due to crystal growth will be wider). Therefore, if the carbon black is not uniformly dispersed in the melt processable fluoropolymer, there will be a greater fraction of the pure melt processable fluoropolymer which is not hindered by the carbon black; accordingly, the normal crystallization peak height (FIG. 1B–H2) in the crystallization growth rate will increase (the crystal growth occurs in a narrow temperature range, narrowing the width of the crystallization curve due to crystal growth). When comparable amounts of various carbon blacks are incorporated, the structured carbon black, such as is characteristic of acetylene black, will have a greater heat of nucleation-related crystallization for the conducting fluoropolymer compared to that of the other conducting carbon blacks, and the height of the normal crystallization peak for crystal growth will be less. Thus, it is preferred to use carbon blacks like acetylene black also from the standpoint of better dispersion of the conducting carbon black.

The fluoropolymer/carbon black composition of the present invention can be in the many forms and have the utilities as described above for the compositions made by the process of the present invention. Thus, the shaped article finally produced may be any molded article of the composition of the present invention which requires conductivity. Examples include tubes, sheeting, rods, fibers, gaskets, conducting jigs related to semi-conductor manufacture, and the like.

The conducting fluoropolymer composition of this invention has the conducting carbon black and the melt processible fluoropolymer fine powder more uniformly dispersed so that the molded article shows stable electrical resistance, and has better surface smoothness and precision. The article does not release the conducting particles into the liquid of the device, even when used in a wafer holding jigs or solvent lines used in the device for manufacturing semi-conductors, thereby permitting the production of a conducting fluoropolymer composition product which does not pollute the device.

Since there is a correlation between the state of the carbon black dispersion and the DSC-crystallization curves, the use of the DSC analytical method proposed by this invention permits a ready evaluation of the degree of carbon black dispersion.

The cutter mixer used in this invention which comprises pulverizing and mixing the acetylene black and the fluoropolymer fine powders themselves, can manufacture a conducting fluoropolymer composition in which the conducting carbon black and the melt processable fluoropolymer fine powder are uniformly dispersed independent of the melt viscosity of the melt processable fluoropolymer.

EXAMPLES

The present invention is illustrated in the following examples. The tetrafluoroethylene-perfluoro(alkyl vinyl ether) copolymer (PFA) used is tetrafluoroethylene-perfluoro(propyl vinyl ether) copolymer (TFE/PPVE, hereinafter referred to as PFA-C3, melting point 309° C., PPVE content=3.5 wt %) or tetrafluoroethylene-perfluoro(ethyl vinyl ether) (PEVE, hereinafter referred to as PFA-C2, melting point 290° C., PEVE content=7.1 wt %). The average particle diameter of the melt-processible fluoropolymer coagulum particles and the conductive fluoropolymer powder composition obtained by the process of the present invention, and the surface smoothness and surface resistivity of articles (thin tubes) extruded from the powder compositions are determined by the methods described below. Crystallization temperature and the heat of crystallization, the dispersion state of carbon black in the fluoropolymer composition of the present invention and the liberation (lack of) carbon black from such composition are also described below.

(a) Average particle diameter: The average particle diameter of the melt-processible fluoropolymer coagulum particles and the conductive fluoropolymer powder compositions obtained by the process of the present invention is measured using a laser diffraction particle size distribution measurement apparatus from Helos & Rodos, Sympatec GmbH, Germany.

(b) Surface smoothness: Conductive melt-processible fluoropolymer powder composition from the cutter-mixer described in Example 1 is extruded at 370° C. and 20 rpm using a twin-screw extruder (Laboplastmill 30C150, Toyo Seiki Seisakusho) for pelletizing and made into a tube of thickness 50 □m and inner diameter 40 mm using a 30 mm uniaxial extruder. The tube surface smoothness is measured using a contact needle surface roughness measurement apparatus (Surfcom 575A-3D, product of Tokyo Seimitu). Measurements are made at five randomly chosen positions, and the average value is reported as surface smoothness.

(c) Surface resistivity: Resistivity is the reciprocal of conductivity and is measured as described here. The HR probe of the surface resistivity measurement apparatus (HIRESTA IP) of Mitsubishi Yuka Co. is contacted with the surface of the above tube, and 10 V (DC) is applied for 10 sec, and the value shown in the indicator is reported as the surface resistivity in ohms ($\Omega$) (see JIS K6911 or ASTM D 257). Measurements are made at five randomly chosen positions, and average, minimum, and maximum values are reported. By uniform surface resistivity is meant that the maximum surface resistivity value divided by the minimum surface resistivity value gives a quotient of less than about 100, preferably less than about 50, more preferably less than about 20, and most preferably about 10 or less.

(d) Crystallization temperature and the heat of crystallization: These are measured using a Perkin Elmer differential scanning calorimeter, DSC model 7. The sample is heated to 360° C. at a rate of 10° C./min, followed by holding for 5 minutes at 360° C. to melt the crystals completely, and then cooling at a fixed rate (12° C./min) to 200° C.; the minimum of the crystallization peak obtained for the low temperature side from the crystallization curve is determined as the crystallization temperature, from peak area of which the heat of crystallization is obtained (J/g).

Figure 1:
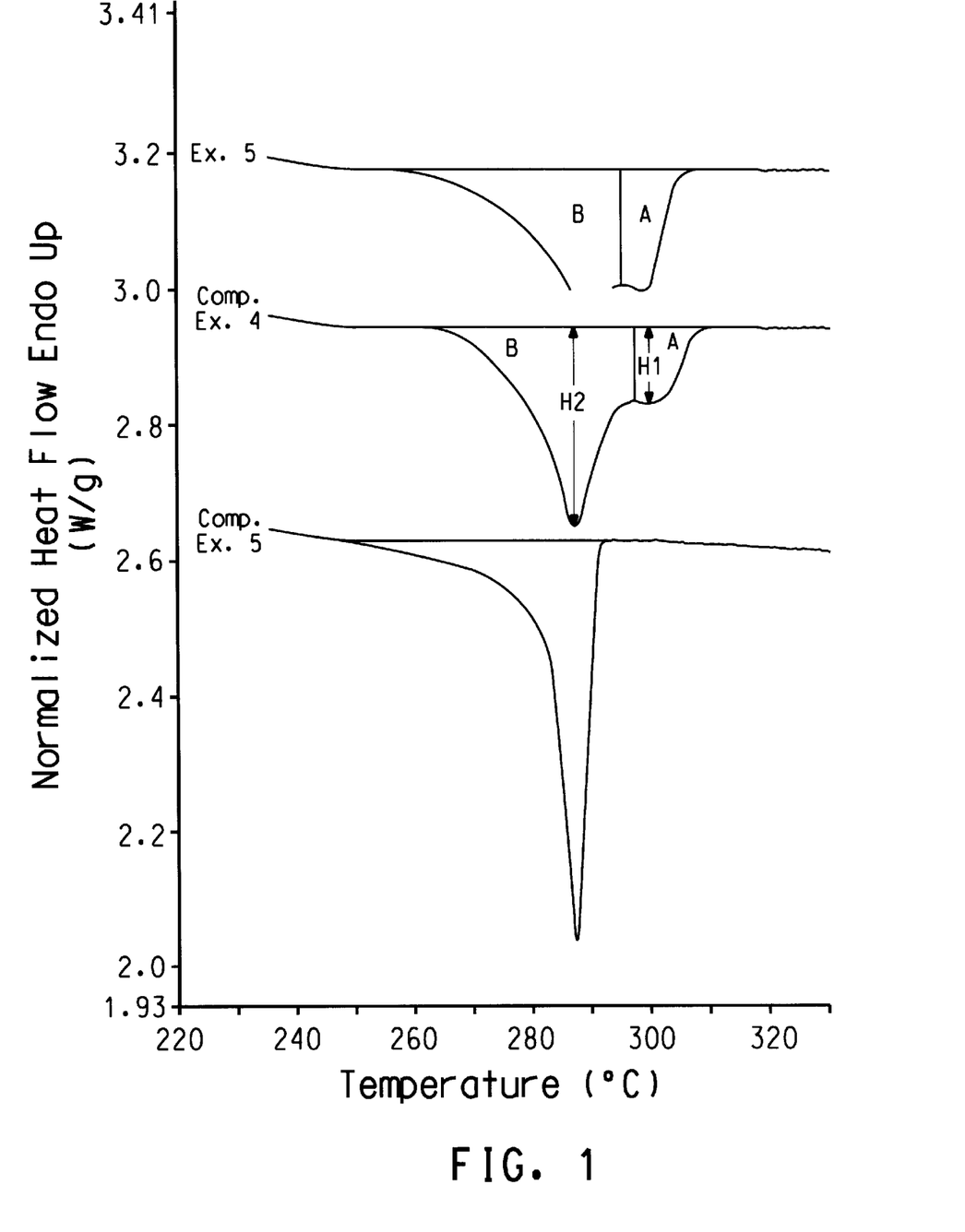
FIG. 1 shows DSC crystallization peaks for the conducting fluoropolymer compositions for Example 5 and Comparative Examples 4 and 5.

A fluoropolymer by itself or a composition obtained by mixing it with a conducting carbon black other than acetylene black gives a single crystallization peak, but a sample mixed with acetylene black gives two crystallization peaks wherein the acetylene black acts as a PFA nucleating agent, resulting in a nucleation-related high temperature side peak (FIG. 1A) and a normal crystal growth low temperature side peak (FIG. 1-B, appearing near the normal fluoropolymer crystallization peak temperature).

(e) Dispersion state of carbon black: Since there is a correlation between the dispersion state of the acetylene black used in the Examples and the heat of crystallization due to nucleation, the state of acetylene black dispersion is evaluated in terms of the ratio of the nucleation crystallization heat (FIG. 1 area A) with respect to the total heat of crystallization (FIG. 1: area A+area B) as obtained with DSC, and the ratio of the nucleation crystallization peak height (H1 in FIG. 1) to the normal crystallization peak height (H2 in FIG. 1). For evaluating the dispersion state of carbon black, the heat of crystallization and the crystallization peak height are used as obtained from crystallization peaks as the material is allowed to crystallize at a cooling rate of 12° C./min in the DSC of the sample. Sometimes the crystallization peaks by DSC are not completely resolved. They may overlap, in which case the local minimum between the two peaks is taken as the dividing point and a vertical line from the minimum to the baseline is taken as the border between the two peaks. When the higher temperature peak is a shoulder on the larger normal crystallization peak, the inflection point is taken as the dividing point and a vertical line from the inflection point to the baseline is taken as the border between the two peaks. The length of the vertical line is taken as H1.

(f) Liberation of carbon black (release): The above tube sample is dipped 24 hours in hydrochloric acid, followed by water washing and pressing a white filter paper onto the surface and scratching the surface with the finger over the filter paper to compare the extent of transferring carbon black to the filter paper for evaluation of carbon black release. O: no deposition of carbon black on the filter paper; Δ: a slight transfer of carbon black to white paper; x obvious deposition on visual inspection.

(g) Polymer melting point is determined by the method of ASTM D 3418 using the procedure for first-order transition.

Example 1

Sixty kg of 30 wt % aqueous PFA-C3 dispersion (average particle size 0.2 μm) obtained from the emulsion polymerization is charged to a kettle (100 L) equipped with a stirring shaft with a 6-bladed down flow propeller and drainage, and 500 g of 60% nitric acid is added with stirring at 300 rpm (peripheral speed 4.7 m/s), followed by further stirring at 300 rpm for 10 min to coagulate the aqueous dispersion then at 450 rpm (peripheral speed 7.1 m/s) for 20 min to allow coagulum particles to rise to the surface of the aqueous polymerization medium and to separate from the liquid. The liquid is discharged from the stirring kettle. Then water is added to wash coagulum particles. The particles are then dried at 160° C. for 24 hr to obtain PFA-C3 coagulum particles. The size of the PFA-C3 coagulum particles is measured by the laser diffraction particle size distribution measurement apparatus. The average particle diameter is 6 μm.

Fourteen kg of the coagulum particles and 1 kg of acetylene black aggregates (F-35X made by Denki Kagaku Kogyo (Inc.), average particle size 0.025 μm) are charged to the cutter-mixer (AC-200S made by Aikosha Seisakusho) at room temperature, and pulverized at 3600 rpm (peripheral speed 75.3 m/s) for 15 min to obtain a uniform mixture powder composition of the present invention in which coagulum particles of PFA are coated with carbon black particles. This powder composition is measured for the average particle size by the same apparatus used above. Results are summarized in Table 1.

The powder composition obtained is pelletized with a twin screw extruder (made by Toyo Seiki Seisakusho) and melt-extruded to make tubing of 50 μm in thickness and 40 mm in inside diameter. Properties of the tube are summarized in Table 1.

Example 2

PFA-C3 coagulation powder and pulverized powder composition of the present invention are prepared as described in Example 1 by using 0.5 kg of Ketjen black (Ketjen black EC) in place of the acetylene black and made into a tube. The amount is reduced to 0.5 kg because the Ketjen black has a tree like microstructure which provides greater electrical conductivity than acetylene black. Results are summarized in Table 1.

Example 3

According to the method of Example 1, 60 kg of a 30 wt % PFA-C2 fluoropolymer aqueous dispersion (average particle diameter 0.1 μm) obtained by emulsion polymerization is coagulated and dried to obtain a PFA-C2 coagulation fine powder (coagulum particles). The coagulum powder thus obtained is measured by the above described laser diffraction particle size distribution measurement apparatus. The average particle diameter is 5.8 μm. Using the cutter-mixer and the mixing conditions of Example 1, 14 kg of the PFA-C2 coagulum particles and 1.0 kg of acetylene black aggregates are mixed as in Example 1 to obtain another conductive fluoropolymer powder composition of the present invention. This particle size of this conductive fluoropolymer powder is measured by the above particle size distribution measurement apparatus. Results are summarized in Table 1. As in Example 1, the conductive fluoropolymer powder is pelletized and made into a tube. Properties of the tube obtained are summarized in Table 1.

Comparative Example 1

Fluoropolymer coagulum particles and powder composition are prepared as in Example 1 but with solvent granulation using 10 kg of 1,1,1,2,3,4,4,5,5,5-decafluoropentane after addition of 500 g of 60% nitric acid to form large granules of the coagulated fluoropolymer. The coagulum particles and carbon black aggregates are mixed as in Example 1. Tubing is extruded using the resulting mixture and measured for surface resistivity and surface smoothness. Results are summarized in Table 1.

Comparative Example 2

Fluoropolymer coagulum particles made according to the teaching of this invention and acetylene black are combined as described in Example 1 except that a Henshel mixer is used. The Henshel mixer has a rotating blade for mixing but not cutting that is not for particle size reduction on the scale necessary for the method of this invention. The resulting mixture is extrusion molded to form a tube. The tube is found to have surface resistivity is more than $10^6$ Ω greater than that for the composition of Example 1, indicating poor dispersion of carbon black in the fluoropolymer. The tube has poor surface smoothness that is also the result of poor dispersion of carbon black. Nonuniform dispersion causes nonuniform viscosity in the molten polymer. At high local concentrations of carbon black, the melt viscosity is high. These high viscosity regions contribute to surface roughness.

Summary of Examples 1–3 and Comparative Examples 1 and 2

As shown in the Table, the conductive fluoropolymer powder compositions (Examples 1–3) obtained according to the method of the present invention by pulverization/mixing of the melt-processable fluoropolymer coagulum particles of average particle diameter 10 μm or less with carbon black aggregates in a cutter-mixer provide a uniform mixture of carbon black and the heat-meltable fluoropolymer coagulum particles in which the carbon black coats the coagulum particles. In these Examples, the temperature of the uniform mixture exiting the cutter-mixer is about 150 to 200° C. The articles (tubes) melt-fabricated this conductive fluoropolymer powder have uniform surface resistivity regardless of where the resistivity measurement is made. The tube of Example 2, in which Ketjen black rather than acetylene black is used is inferior in surface smoothness, due to impurities in Ketjen black. The tubes of Examples 1 and 3, in which acetylene black is used, exhibit excellent surface smoothness, much better than that exhibited by Comparative Example 1, in which the fluoropolymer is granulated to a large particle size prior to the pulverizing/mixing step.

The conductive fluoropolymer powder composition (Comparative Example 1) obtained by pulverization and mixing in a cutter-mixer of the PFA coagulation powder of average particle diameter 220 μm obtained by solvent granulation, in place of the melt-processible fluoropolymer coagulum particles of average particle diameter 10 μm or below obtained by the method of the present invention contains large PFA particles, thus even after pulverization and mixing in a cutter-mixer, the conductive fluoropolymer powder composition still has large particle diameter with poor carbon black dispersion, resulting in increased and nonuniform surface resistivity of the extruded tube.

Accordingly, it is demonstrated that using the melt-processible fluoropolymer coagulum particles that have an average particle size of 10 μm or less is preferred.

TABLE 1

| | | Ex. 1 | Ex. 2 | Ex. 3 | Comp. Ex. 1 |
|---|---|---|---|---|---|
| Raw material | PFA-C3 (kg) | 14 | 14 | — | 14 |
| | PFA-C2 (kg) | — | — | 14 | — |
| | Acetylene black (kg) | 1.0 | — | 1.0 | 1.0 |
| | Ketjenblack (kg) | — | 0.5 | — | — |
| | Average particle diameter of PFA fine particles (μm) | 6.0 | 6.0 | 5.8 | 220 |
| Average particle diameter of mixed powder (μm) | | 4.5 | 6.0 | 5.8 | 15.2 |
| Tube properties | Surface smoothness (μm) | 0.11 | 0.37 | 0.10 | 0.26 |
| | Surface resistivity Ω | $\times 10^5$ | $\times 10^4$ | $\times 10^6$ | $\times 10^9$ |
| | Average | 9.5 | 4.5 | 4.5 | 6.5 |
| | Minimum | 3.5 | 1.3 | 2.3 | 3.2 |
| | Maximum | 15.8 | 14.1 | 8.9 | 1260 |
| | Max/Min | 4.5 | 10 | 3.9 | 400 |

Example 4

An aqueous 30 wt % PFA dispersion (PFA-C3) obtained by emulsion polymerization, 60 kg, is placed in an agitation tank (100 liter capacity) equipped with an agitation shaft equipped with a down flow type 6-blade propeller and a draining means, followed by adding 500 g of 60% aqueous nitric acid with agitation at 300 rpm. The mixture is further agitated 10 minutes at 300 rpm to coagulate the aqueous dispersion, which is then stirred for 20 minutes at 450 rpm to let the fine coagulated PFA particles rise to the top of the aqueous medium thereby separating them from the aqueous medium.

Then the aqueous polymerization medium is drained from the stirred tank, water is added to water wash the PFA coagulated particles, and it is allowed to pass through a stainless steel screen (opening 100–150 μm). The PFA aggregated particles remaining on the screen are dried for 24 hours at 160° C. to obtain a PFA fine powder. The resulting PFA fine powder had an average particle size of 6 μm as measured for particle size using the above described laser diffraction particle size distribution instrument.

14 kg of the PFA fine powder and 1.05 kg of acetylene black (F-35X, made by Denki Kagaku Kogyo KK and having a low amount of impurities as follows (ppm): Fe 0.8, Si 0.6, Al 0.5, S 2, Na<0.5, Cl 2) is fed to an impact shear mixer (Cutter Mixer, made by Aikosha Seisakusho SC-3200S) with high speed rotation blades in the form of a cutter, and pulverized and mixed at 3600 rpm (circumferential speed of 75.3 m/sec) for 10 minutes thereby producing a conducting fluoropolymer powder composition. The resultant conducting fluoropolymer composition is measured using the above particle size distribution instrument, which shows an average particle size of 4.5 μm. Table 2 shows the results of measuring crystallization steps with a DSC of the resultant conducting fluoropolymer powder composition.

Example 5

Procedures identical to those of Example 4 are used except for extending the Cutter Mixer pulverization-mixing times to 20 minutes to prepare a conducting fluoropolymer powder composition. The results are given in Table 2. Table 2 shows the results of measuring crystallization by DSC of the powder composition. FIG. 1 shows the DSC crystallization curve for the conducting fluoropolymer powder composition.

Example 6

Procedures identical to those of Example 4 are used except for the Cutter Mixer pulverization mixing times being 30 minutes to prepare a conducting fluoropolymer powder composition. The results are given in Table 2. Table 2 shows the results of measuring crystallization by DSC of the powder composition.

Example 7

Procedures identical to those of Example 4 are used except for the Cutter Mixer pulverization-mixing time being 40 minutes to prepare a conducting fluoropolymer powder composition. The results are given in Table 2. Table 2 shows the results of measuring crystallization by DSC of the powder composition.

Comparative Example 3

Procedures identical to those of Example 4 are used except for the Cutter Mixer pulverization-mixing time being 5 minutes to prepare a conducting fluoropolymer powder composition. The results are given in Table 2. Table 2 shows the results of measuring crystallization by DSC of the powder composition.

Comparative Example 4

Instead of the above PFA fine powder, 60 kg of a 30% by weight aqueous PFA dispersion prepared by emulsion polymerization is placed in an agitating tank (100 liter) having an agitating shaft equipped with a down flow type 6-blade propeller and a draining means, stirred at 300 rpm (circumferential speed 4.7 m/sec), followed by adding 500 g of 60% nitric acid, and further stirred 10 minutes at 300 rpm;

when the aqueous dispersion is coagulated, 9 kg of Vertrel XFA (Mitsui-DuPont Fluorochemical Company), 9 kg is added and stirred 20 minutes to carry out a solvent granulation to give PFA coagulant particles with an average particle size of 200 μm, which are then pulverized and mixed in a Cutter Mixer; otherwise, the same procedure as that of Example 4 is used to prepare a conducting fluoropolymer powder composition. Table 2 and FIG. 1 show the results of measuring DSC and a crystallization curve for the powder composition.

Comparative Example 5

Example 4 is repeated except for replacing the acetylene black with Ketjen black (Ketjen EC; impurities ) ppm: Fe 53, Si 12, Al 10, S 810, Na 17, Cl 4), 0.49 kg, and changing the Cutter mixer pulverization-mixing time to 20 minutes to obtain a conducting fluoropolymer powder composition. Because of the greater electrical conductivity of Ketjen black as compared to acetylene black the amount of Ketjen black added is reduced to 0.49 kg. The results are given in Table 2 and FIG. 1.

Comparative Example 6

The fluoropolymer/acetylene black composition of Example 4 is mixed for 20 minutes in a Henshel mixer. DSC analysis of the resulting material gives a crystallization curve in which two peaks are not well-separated, similar to Example 5 in FIG. 1. The crystallization curve resembles the curve of Comparative Example 4 in FIG. 1. Results are summarized in Table 2.

correlation between the dispersion state of acetylene black and the nucleation heat of crystallization obtained by DSC, indicating that the more uniform the dispersion of acetylene black in the PFA fine powder, the greater the ratio of the nucleation heat of crystallization to the total heat of crystallization (FIG. 1 area A+area B), or the greater the ratio of the nucleation crystallization peak to the crystal growth peak height (H1/H2). (Examples 4–7)

The results in Table 2 and FIG. 1 show that a sample prepared (Comparative Example 4) by replacing the PFA fine powder having an average particle size of 6 μm prepared by non-solvent granulation with high speed stirring, with a PFA coagulated particulate material having an average particle size of 200 μm obtained by solvent granulation, has a poor acetylene black dispersion state, which reduced the ratio of the nucleation heat of crystallization and the ratio of the nucleation crystallization peak to crystal growth peak (H1/H2).

A sample prepared with Ketjen black (Comparative Example 5) in place of acetylene black shows no crystallization peak for nucleation because Ketjen black has no nucleus forming effect. Since there is essentially no change in crystallization peak temperature by crystal growth in every sample (FIG. 1 area B peak), this suggests that area A of FIG. 1 is the crystallization due to nucleation.

A sample prepared from PFA and acetylene black in a Henshel mixer (Comparative Example 6) has poor acetylene black dispersion as shown by a A/(A+B) and H1/H2 ratios that are low.

TABLE 2

| | Comparative Example | Examples | | | | Comparative Examples | | |
|---|---|---|---|---|---|---|---|---|
| | 3 | 4 | 5 | 6 | 7 | 4 | 5 | 6 |
| PFA (kg) | 14 | 14 | 14 | 14 | 14 | 14 | 14 | 14 |
| Acetylene black (kg) | 1.05 | 1.05 | 1.05 | 1.05 | 1.05 | 1.05 | | 1.05 |
| Ketjen black (kg) | | | | | | | 0.49 | |
| Cutter Mixer mixing time (min) | 5 | 10 | 20 | 30 | 40 | 20 | 20 | |
| Henshel Mixer mixing time (min) | | | | | | | | 20 |
| Heat of nucleation crystallization (A)(J/g) | 3.80 | 4.60 | 5.00 | 5.68 | 5.64 | 3.81 | 0 | 3.60 |
| Heat of total crystallization (A + B)(J/g) | 23.0 | 25.5 | 24.8 | 24.6 | 23.5 | 24.6 | 21.9 | 24.4 |
| (A)/(A + B) | 0.165 | 0.180 | 0.202 | 0.231 | 0.240 | 0.155 | 0 | 0.148 |
| H1/H2 | 0.608 | 0.639 | 0.689 | 0.720 | 0.738 | 0.388 | 0 | 0.380 |
| Crystallization Peak Temperature (° C.) | 286.1 | 286.5 | 286.4 | 286.4 | 286.5 | 286.2 | 287.8 | 286.1 |

The results given in Table 2 show that the longer the Cutter Mixer pulverization-mixing time, the greater the ratio of the nucleation heat of crystallization to the normal heat of crystallization (FIG. 1 area A) or the ratio of the nucleation heat of crystallization to the total heat of crystallization (FIG. 1, area A+area B) as measured by DSC, and the greater the ratio of the nucleation crystallization peak height to the crystal growth peak height (H1/H2). Therefore, there is a The conducting fluoropolymer powder compositions prepared in examples of this invention and comparative examples are extruded through a twin screw extruder (manufactured by Toyo Seiki Seisakusho, Laboplatomil 30C150) at 370° C. at 20 rpm to generate pellets, which are then used to prepare a tube 50 mm outer diameter, 40 mm inner diameter with a 30 mm single screw extruder. Table 3 shows the result of evaluating the resultant tube.

TABLE 3

|  | Comparative Example 3 | Examples | | | | Comparative Example | | |
| --- | --- | --- | --- | --- | --- | --- | --- | --- |
|  |  | 4 | 5 | 6 | 7 | 4 | 5 | 6 |
| PFA (kg) | 14 | 14 | 14 | 14 | 14 | 14 | 14 | 14 |
| Acetylene black (kg) | 1.05 | 1.05 | 1.05 | 1.05 | 1.05 | 1.05 |  | 1.05 |
| Ketjen black (kg) |  |  |  |  |  |  | 0.49 |  |
| Cutter mixer mixing time (min) | 5 | 10 | 20 | 30 | 40 | 20 | 20 |  |
| Henshel mixer mixing time (min) |  |  |  |  |  |  |  | 20 |
| Surface smoothness (μm) | 0.15 | 0.12 | 0.10 | 0.10 | 0.09 | 0.25 | 0.35 | 0.28 |
| Average surface resistance (Ω/Sq) | $5 \times 10^6$ | $1 \times 10^6$ | $8 \times 10^5$ | $3 \times 10^5$ | $5 \times 10^5$ | $5 \times 10^8$ | $7 \times 10^4$ | $9 \times 10^8$ |
| Carbon black release tendency | Δ | ○ | ○ | ○ | ○ | Δ | ○ | Δ |

The results shown in Table 3 indicate that conducting fluoropolymer tubes molded using conducting fluoropolymer composition obtained by the process of this invention show more uniform dispersion of the conducting carbon black compared to conducting fluoropolymer tubes (Comparative Examples 3–6) using conducting fluoropolymer powder compositions obtained by other methods; they also show reduced variation in surface resistance and excellent surface smoothness. Since the conducting particles are not released into the solution, this invention provides a conducting fluoropolymer composition which does not pollute the device.

What is claimed is:

1. A method for producing a mixture of carbon black in melt-processible fluoropolymer, comprising pulverizing a composition comprising (a) said carbon black and (b) said melt-processible fluoropolymer, said carbon black in said composition being in the form of aggregates of primary particles and said melt-processible fluoropolymer in said composition being in the form of dry coagulum particles of aqueous dispersion polymerized melt-processible fluoropolymer, the pulverizing of said composition causing the disintegration of said aggregates and the coating of said coagulum particles with the disintegrated aggregates, thereby obtaining said mixture.

2. The method for producing the mixture of claim 1 in which said melt-processible fluoropolymer is a polymer or copolymer of monomers chosen from tetrafluoroethylene, hexafluoropropylene, perfluoro (alkyl vinyl ether), vinylidene fluoride and vinyl fluoride.

3. The method for producing the mixture of claim 1 in which said coagulum has an average particle size of no more than about 10 μm.

4. The method for producing the mixture of claim 1 in which said mixture is in the form of a powder having an average particle size of about 2 to 10 μm.

5. The method of producing the mixture of claim 1 wherein the amount of carbon black in said composition is about 1 to 15 wt % based on the total weight of said fluoropolymer and said carbon black.

6. The method of producing the mixture of claim 1 wherein said coagulum particles are formed by agitation of said aqueous dispersion, followed by separation of said coagulum particles from the aqueous medium of said aqueous dispersion and drying and additionally carrying out said agitation in the presence of electrolyte added to said aqueous dispersion.

7. The method of producing the mixture of claim 1 wherein said pulverizing causes greater disintegration of said aggregates than of said coagulum particles.

8. The method of producing the mixture of claim 1 wherein said aggregates have an average particle size of greater than about 1 μm.

9. The method of producing the mixture of claim 1 wherein said pulverizing causes said composition to heat up to a temperature in the range of about 125 to 225° C. during said pulverizing.

10. A method for producing a melt-processible fluoropolymer powder having an average particle size of no more than about 10 μm, comprising stirring an aqueous dispersion polymerization medium containing said fluoropolymer polymerized in said medium, said medium also containing electrolyte, to form a coagulum of said fluoropolymer, separating said coagulum from the resulting medium, drying said coagulum, and then pulverizing said dried coagulum together with carbon black having a primary particle size of no more than about 0.1 μm, and obtaining said powder as a mixture of said carbon black in said fluoropolymer.

11. A fluoropolymer powder comprising coagulum particles of melt-processible fluoropolymer having an average particle size of about 1 to 10 μm coated with particles of carbon black.

12. The melt-processible fluoropolymer powder of claim 11, wherein said particles of carbon black are disintegrated aggregates of carbon black.

13. The melt-processible fluoropolymer powder of claim 11, wherein the average particle size of said coagulum is about 2 to 6 μm.

14. An electrically conducting fluoropolymer composition, said composition comprising conducting carbon black dispersion in a melt processible fluoropolymer wherein said melt processible fluoropolymer has two crystallization peaks when analyzed in a differential scanning calorimeter when allowed to crystallize from a temperature of not less than its melting point at a cooling rate of 12° C./min; and the ratio of the crystallization peak heights (high temperature side peak/low temperature side peak) is about 0.65 or greater; and/or the ratio of the high temperature side crystallization peak areas [high temperature side peak area/ (high temperature side peak area+low temperature side peak area)] is about 0.18 or greater.

15. An electrically conducting fluoropolymer composition of claim 14, wherein the high temperature side crystallization peak is a crystallization peak associated with nucleation and the low temperature side crystallization peak is a normal crystal growth peak.

16. An electrically conducting fluoropolymer composition of claim 14, said composition containing about 1–15% by weight of said electrically conducting carbon black.

17. An electrically conducting fluoropolymer composition of claim 14 wherein the electrically conducting carbon black is acetylene black.

18. An electrically conducting fluoropolymer composition of claim 14, wherein the melt processible fluoropolymer is a copolymer of tetrafluoroethylene and a perfluoro(alkyl vinyl ether).

19. The composition of claim 14 in the form of a melt fabricated article.

20. The composition of claim 19 wherein said article is pellets.

* * * * *